April 15, 1930.  E. DEIERLEIN  1,755,104
COUPLING
Filed Oct. 3, 1927
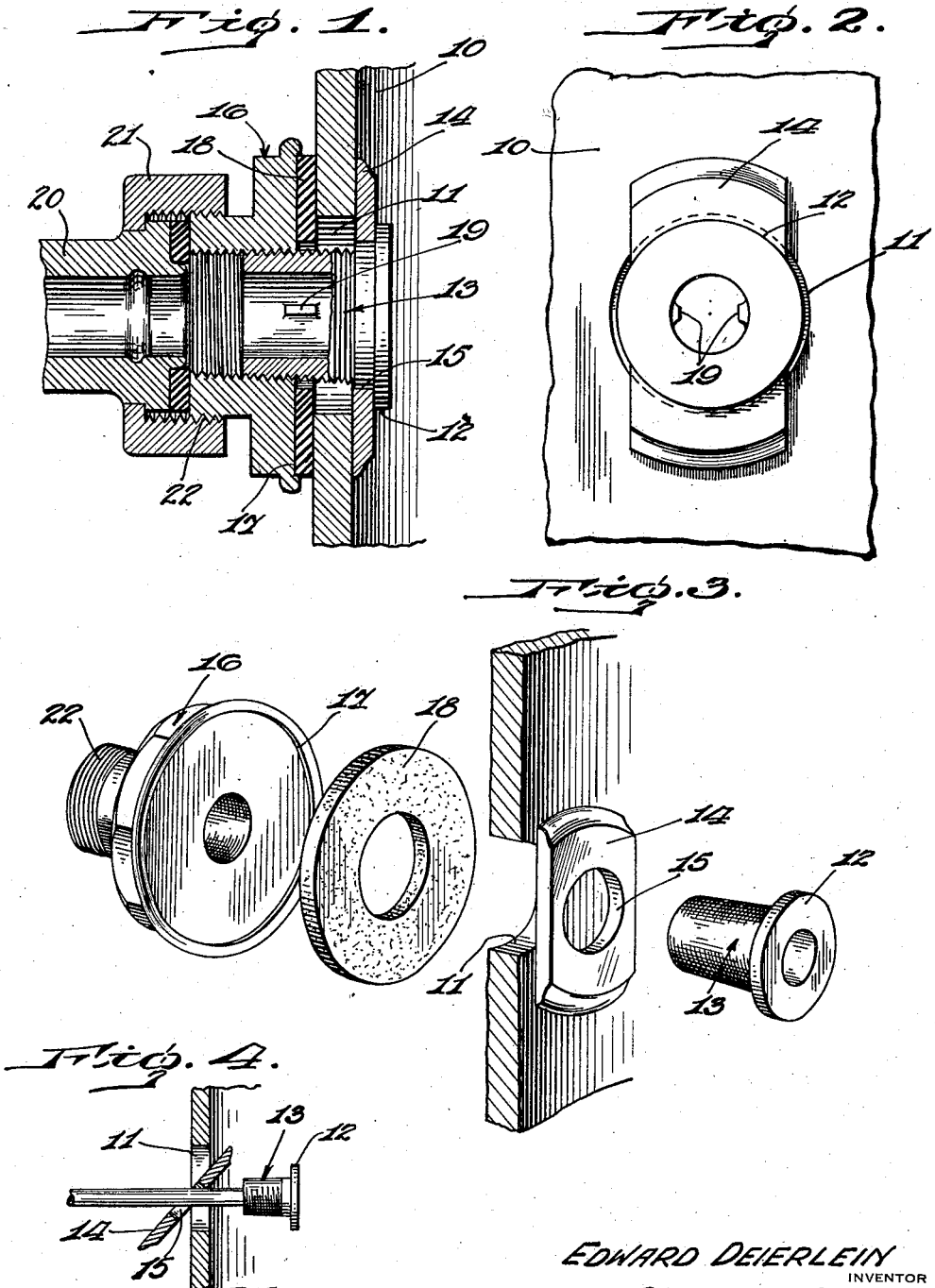
EDWARD DEIERLEIN
INVENTOR Patented Apr. 15, 1930

1,755,104

UNITED STATES PATENT OFFICE

EDWARD DEIERLEIN, OF PORT CHESTER, NEW YORK

COUPLING

Application filed October 3, 1927. Serial No. 223,773.

This invention relates to improvements in couplings and more particularly to a tank or boiler coupling.

The primary object of the invention resides in the provision of a coupling for connecting a pipe to the wall of a boiler or tank wherein access cannot be had from the interior of the tank when making the connection, but which coupling is applied and anchored to the inner walls thereof and assures a water tight connection between the walls of the tank and the pipe to be connected.

Another object of the invention is the provision of a tank coupling which includes a nipple supported by an anchor plate of a size to pass through a hole in a tank and which engages the inner walls of the tank and bridges the hole, to permit a washer to be fitted over the nipple for sealing engagement with the outside of the joint between the nipple and the tank and which is held by a clamping nut threadedly connected to the nipple and adapted to be screwed tight against the wall of the tank and which nipple serves to draw the parts into tight engagement, and to which nut, the pipe to be connected is joined by a suitable union.

Another object of the invention is to provide a coupling for domestic hot water tanks or boilers which consists of but few parts, is simple of construction, easy to assemble, and inexpensive of manufacture.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a vertical sectional view of my improved coupling in assembled position upon a tank.

Figure 2 is an end elevational view looking from the interior of the tank.

Figure 3 is a collective perspective view of the parts in a separated position.

Figure 4 is a detail sectional view showing the manner of inserting the nipple and anchor plate through the opening in the tank.

Referring more particularly to the drawing, the reference numeral 10 designates the wall of a hot water tank or boiler which is provided with a hole or opening 11 of a diameter to permit of the free passage of the annular flange 12 provided on one end of a tapered threaded nipple 13. An anchor plate 14 engages the inner walls of the tank and bridges the opening 11 to support the nipple 13 while the flange 12 engages the anchor plate to hold the plate in position. The anchor plate is provided with an opening 15 through which the nipple 13 extends to the exterior side of the tank wall.

A nut 16 is threaded to the free end of the nipple 13 and is provided with a recess 17 in its flat bearing surface for the reception of a rubber or yieldable gasket 18, which gasket bears against the exterior of the tank wall when the nut is screwed home upon the nipple and which nut is shaped to fit the curvature of the tank wall. The nipple serves to pull the anchor plate and nut tight against the wall of the tank to provide a tight rigid construction. The rubber gasket 18 serves to seal the opening 11 to prevent any leakage of the contents of the tank.

For the purpose of finally tightening the parts after the nut has been partially screwed home, I provide the inner walls of the nipple with diametrically opposed spanner lugs 19 by which the nipple may be turned by a spanner wrench. When the coupling has been made tight by the screwing home of the clamping nut, the pipe 20 to be connected with the tank 10 is joined to the nut 16 by a well-known form of union 21, the nut being provided with external threads 22 to which the union is threaded.

In assembling the coupling, the nipple 13 is first inserted through the hole 11 and is supported from the exterior of the tank by a suitable instrument such as a spanner wrench. The anchor plate 14 is also supported by the instrument with which the nipple is held but the anchor plate being of a length greater than the diameter of the hole 11, it is necessary to tilt the plate at an angle as shown in Figure 4 of the drawing. When plate has been inserted through the opening, it is positioned to lie flat against the inner walls of the tank and to bridge the opening, after which the nipple is pulled through the opening 15 in the anchor plate and the clamping nut 16 initially applied by threading the same partially upon the nipple after which it is moved home by the rotation of the nipple.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In combination with a closed tank having an opening in the wall thereof, a nipple externally threaded at one end and having a flange at its opposite end for insertion in the tank through said opening, a clamping nut threadedly connected to said nipple externally of said tank, said nut having a recessed face, a gasket fitting between said face and the outer surface of the tank, said nut being externally threaded to receive a union for connecting a pipe with said nipple, and an elongated anchor plate having an aperture therein to accommodate said nipple and retain its flange within the tank when said clamping nut is screwed home, the diameter of said opening being greater than the transverse dimension of said anchor plate to admit the latter to said tank, and the longitudinal dimension of said plate being greater than the diameter of said opening.

In testimony whereof I have affixed my signature.

EDWARD DEIERLEIN.